United States Patent [19]

Broadhead

[11] 4,054,728
[45] Oct. 18, 1977

[54] SODIUM-SULFUR BATTERIES

[75] Inventor: John Broadhead, Morristown, N.J.

[73] Assignee: Bell Telephone Laboratories, Incorporated, Murray Hill, N.J.

[21] Appl. No.: 766,969

[22] Filed: Feb. 9, 1977

[51] Int. Cl.² .................................. H01M 10/39
[52] U.S. Cl. ................................ 429/104; 429/212; 429/218
[58] Field of Search ............... 429/104, 101, 191, 193, 429/212, 215, 218, 30, 31

[56] References Cited
U.S. PATENT DOCUMENTS

| 3,404,035 | 10/1968 | Kummer et al. | 429/104 X |
| 3,946,751 | 3/1976 | Breiter et al. | 429/218 X |
| 3,985,576 | 10/1976 | Lingscheit et al. | 429/103 |

Primary Examiner—Anthony Skapars
Attorney, Agent, or Firm—Walter G. Nilsen

[57] ABSTRACT

A sodium-sulfur battery is described which contains, in addition to a conventional sodium electrode, a conventional sulfur electrode and a conventional solid electrolyte, an additive which reduces the operating temperature of the cell without significant deleterious effects on operating characteristics.

9 Claims, 3 Drawing Figures

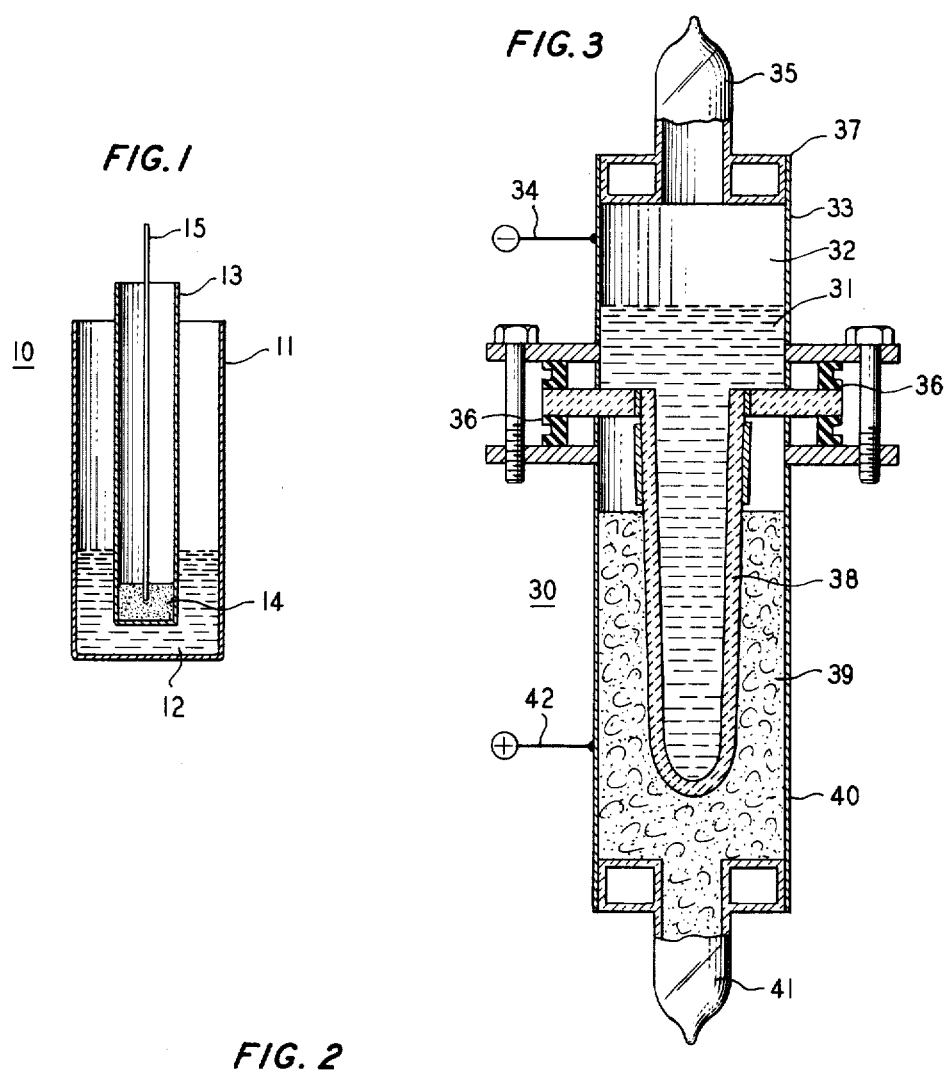
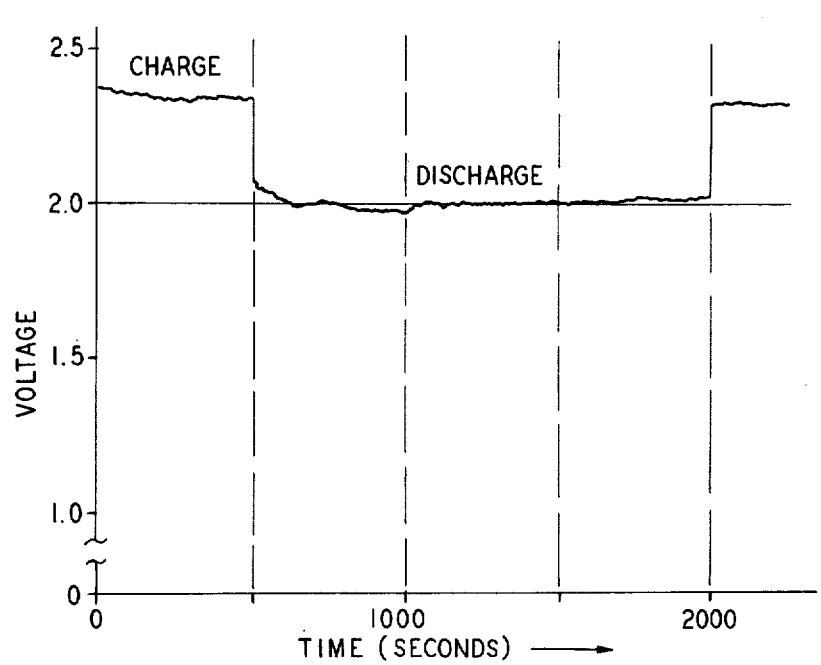

SODIUM-SULFUR BATTERIES

BACKGROUND OF THE INVENTION

1. Field of the Invention

The invention relates to nonaqueous batteries; in particular, to sodium-sulfur batteries.

2. Description of the Prior Art

Sodium-sulfur batteries have certain advantageous characteristics which make them attractive for many commercial applications. For example, they have particularly high energy densities, often in the range of 200 watt-hours per kilogram, and also high power densities. Sodium-sulfur batteries also have particularly high efficiencies and long life times. In addition, sodium-sulfur batteries are inherently inexpensive to make because of the low cost of the materials required for manufacture.

Conventional sodium-sulfur batteries must be operated in the temperature range between 300° and 400° C to prevent solidification of discharge products on the solid electrolyte. Reduction of this operating temperature without significant deleterious effect on operating characteristics would make sodium-sulfur batteries more attractive for many commercial applications.

SUMMARY OF THE INVENTION

The invention is sodium-sulfur batteries which contain certain additives which permit operation at lower temperatures without significant sacrifice in desirable operating characteristics. This additive is a material that contains at least one imidazole or imidazole with aliphatic and/or aromatic substituent. Although the exact mechanism of the invention has not been firmly established, it is believed that the additive prevents solidification of polysulfides formed in the positive electrode on discharge. Such batteries have the advantage of lower operation temperature without significant detriment in operating characteristics.

BRIEF DESCRIPTION OF THE DRAWING

FIG. 1 shows a side view with cut-away of an experimental setup used to test the characteristics of a sodium-sulfur battery made in accordance with the invention;

FIG. 2 shows a graph on coordinates of voltage versus time summarizing data on the cycle performance of a sodium-sulfur battery made in accordance with the invention; and FIG. 3 shows a battery structure suitable for commercial production of sodium-sulfur batteries made in accordance with the invention.

DETAILED DESCRIPTION

The invention is a sodium-sulfur battery containing certain additives generally located in the sulfur (positive) electrode. This additive reduces the operating temperature of the battery without significant detrimental effects to the characteristics of sodium-sulfur batteries. The battery additive contains at least one compound from a group of compounds composed generally of imidazole and certain derivatives of imidazole. Aromatic and aliphatic substituents of imidazole are particularly effective. Although all aromatic and aliphatic substituents of imidazole may be useful, excessive molecular weight of the substituents decreases effectiveness in reducing operating temperature. For this reason, it is preferred that total aromatic and aliphatic substituents on the imidazole ring be limited to a total of six carbons.

For convenience the structural formula of imidazole is shown below:

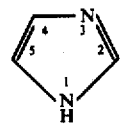

Certain compounds are particularly attractive because of possible low cost and availability. This group of compounds are as follows: imidazole, 1-methyl imidazole, 2-methyl imidazole, 4-methyl imidazole, 1-propyl imidazole, 1-amyl imidazole, 1,2-dimethyl imidazole, 1-ethyl-2-methyl imidazole, 1,4-dimethyl imidazole, 1,5-dimethyl imidazole, 1-phenyl imidazole, 2-phenyl imidazole, 2-ethyl-4-methyl imidazole.

The incorporation of this additive material in the sodium-sulfur battery permits reduction of the operating temperature from about 320° C to about 155° C. Such batteries are conveniently operated between 130° C and 200° C. Generally the sulfur electrode made in accordance with this invention is made up of a mixture of sulfur, sodium sulfide and imidazole. Other materials may be included; for example, carbon or other materials to facilitate current collection in charging and discharging. Although as little as 10 percent by weight of imidazole significantly reduces the operating temperature of the battery, maximum temperature reduction is obtained when the amount of imidazole is between 30 and 40 weight percent. Amounts of additive over 60 weight percent are permissible but unduly reduce battery capacity. The remainder of the battery may be made in accordance with the generally accepted practice. Particular battery structures may be found in the following references: Batteries: Today and Tomorrow, by Don Mennie in *IEEE Spectrum*, March 1976, page 36; and, Annual Report on the Ford Sodium-Sulfur Battery, Contract NSF-C805 (AER-73-07199), Dearborn, Michigan, July 1976. At present sodium is contained in one compartment of the battery and the sulfur electrode in another compartment of the battery. The two electrodes are separated by a so-called solid electrolyte generally made of β-alumina.

Certain experiments were carried out to demonstrate the excellent characteristics of these cells even when operated at much lower temperatures than is traditional. Although the batteries may be operated over a considerable temperature range, a temperature of at least 150° C is desirable because operating characteristics are sometimes diminished below this temperature. Excessive temperatures over approximately 400° C, although not detrimental to battery performance, are generally inconvenient.

FIG. 1 shows the setup used to test a cell 10 made in accordance with the invention. The entire cell is contained in a stainless steel container 11 with the positive electrode 12 made up of approximately equal amounts of sulfur, sodium sulfide and imidazole. The solid electrolyte 13 which separates positive and negative electrodes is made of β-alumina. The negative electrode 14 is made of sodium and a stainless steel wire 15 is used as the contact to the negative sodium electrode. The entire cell is operated at approximately 155° C.

This cell was cycled several times at a current density of approximately 1 milliampere per centimeter square. A typical charge-discharge curve using a two-hour charge and two hour discharge cycle is shown in FIG. 2. This cell was later cycled approximately 23 times at a charge-discharge rate of 3mA/cm². The charging voltage was approximately 2.35 volts and the discharge voltage was approximately 2.00 volts. These experiments show that sodium-sulfur batteries made in accordance with the invention may be operated at substantially lower temperatures than conventional sodium-sulfur batteries without significant degradation in operating characteristics.

FIG. 3 shows a structure 30 suitable for use with sodium-sulfur batteries made in accordance with the invention. The sodium of the negative electrode 31 is contained inside the negative electrode compartment 32 together with the current collector 33 and lead out wire 34 of the negative electrode. A fill tube 35 is also shown together with the compression seal 36 and ring seals 37 which insure exclusion of air and moisture from the battery. A solid electrolyte 38 separates the negative electrode from the positive electrode. The positive electrode 39 contains sulfur, sodium sulfide and additive material selected from one of the imidazole compounds set forth in this disclosure. The lower can material 40 is also shown which acts as current collector for the positive electrode. The positive electrode structure has a filling tube 41 and a wire 42 to make electrical contact with the positive electrode.

What is claimed is:

1. A sodium-sulfur battery comprising a sodium negative electrode, a sulfur positive electrode, and a solid electrolyte CHARACTERIZED IN THAT an additive is present in the battery which consists essentially of at least one compound selected from the group consisting of imidazole, aliphatic and aromatic substituents of imidazole with up to six carbon atoms on all substituents on the compound.

2. The battery of claim 1 in which the additive consists essentially of at least one compound selected from the group consisting of imidazole, 1-methyl imidazole, 2-methyl imidazole, 4-methyl imidazole, 1-propyl imidazole, 1-amyl imidazole, 1,2-dimethyl imidazole, 1-ethyl-2-methyl imidazole, 1,4-dimethyl imidazole, 2-ethyl-4-methyl imidazole, 1,5-dimethyl imidazole, 1-phenyl imidazole, 2-phenyl imidazole, 2-ethyl-4-methyl imidazole.

3. The battery of claim 1 in which the additive consists essentially of imidazole.

4. The battery of claim 3 in which the imidazole is located in the sulfur positive electrode.

5. The battery of claim 4 in which the material in the sulfur positive electrode consists essentially of between 10 and 60 weight percent imidazole.

6. The battery of claim 5 in which the sulfur positive electrode initially consists essentially of approximately equal amounts within ± 10 percent by weight of sulfur, sodium sulfide and imidazole.

7. The battery of claim 1 in which the battery is operated between 130° C and 200° C.

8. The battery of claim 7 in which the battery is operated at approximately 155° C.

9. The battery of claim 1 in which the electrolyte is β-alumina.

* * * * *